Dec. 25, 1923.

H. ERFLE

OCULAR

Filed Aug. 13, 1921

1,478,704

Inventor:
Heinrich Erfle

Patented Dec. 25, 1923.

1,478,704

UNITED STATES PATENT OFFICE.

HEINRICH ERFLE, OF JENA, GERMANY, ASSIGNOR TO THE FIRM OF CARL ZEISS, OF JENA, GERMANY.

OCULAR.

Application filed August 13, 1921. Serial No. 492,114.

(GRANTED UNDER THE PROVISIONS OF THE ACT OF MARCH 3, 1921, 41 STAT. L., 1313.)

*To all whom it may concern:*

Be it known that I, HEINRICH ERFLE, a citizen of the German Empire, residing at Jena, Germany, have invented a new and useful Ocular (for which I have filed an application in Germany, July 23, 1918; Austria, May 28, 1920; England, June 22, 1920, Patent No. 145,503; Italy, June 22, 1920; France, July 2, 1920, Patent No. 518,727; Japan, July 9, 1920, Patent No. 38,488; Poland, July 9, 1920; and Spain, March 4, 1921), of which the following is a specification.

The present invention relates to oculars comprising two lenses, each of which consists of a collective and of a dispersive member, and which are so disposed that the two dispersive members lie outermost, hence, that of the double lens to be turned towards the incident light the dispersive member, and of the double lens to be turned towards the eye the collective member lies foremost. The two constituent members of a double lens are therefore generally cemented together. In special cases, however, the boundary surfaces adjacent to each other of two constituent members may also form a pair of uncemented surfaces. The latter construction, however, will suitably only be chosen if the refractive power of the pair of uncemented surfaces, i. e., the total of the refractive powers of the two adjacent surfaces, does not exceed one fifth of the whole refractive power of the entire ocular. Up to about this extent the pair of uncemented surfaces may be considered to be equivalent to a cemented surface.

According to the invention in oculars of the said type a single collective lens is located between the two double lenses. The computation has proved that by this means there may be attained with these oculars a diminution of the defects in the images, especially of the astigmatism and of the distortion, to such an extent that the field of view may be raised to comparatively large angles, amounting to about 70°. This was not feasible in oculars hitherto in use, if the image was to be of the same quality. The new oculars may be so arranged that even in the case of small focal lengths of the ocular a comparatively large distance of the exit pupil of the telescope from the last lens vertex will still be attained. Generally the new oculars will be composed but of the two double lenses, and, located between them, the collective lens, however, in special cases a field-lens may still be added to these three lenses.

Figure 1:
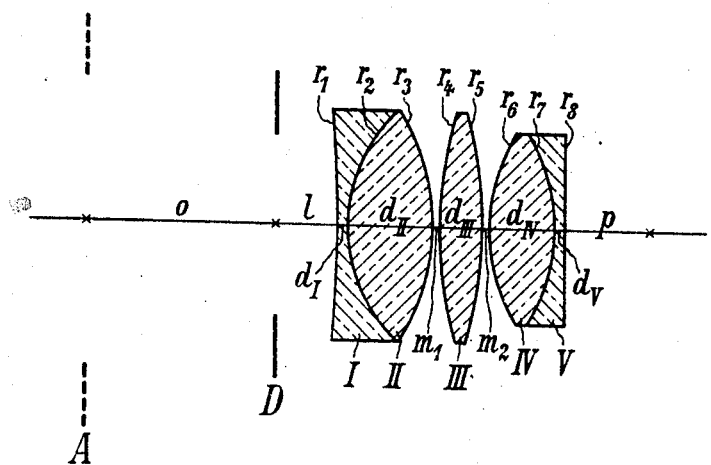
Figure 2:
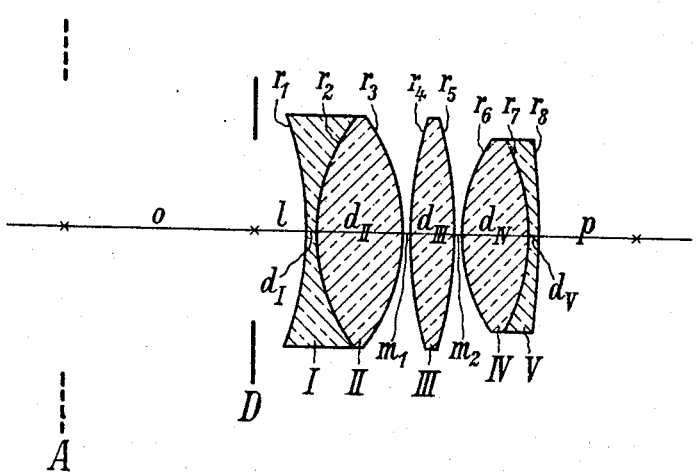

In the annexed drawing: Fig. 1 shows a constructional example of an ocular corresponding to the present invention in axial section, Fig. 2 shows a section through another form of such an ocular.

In the following tables the numerical values of the radii, thicknesses, and distances apply in each case to an ocular having the focal length 100. The kinds of glass used are characterized by their refractive index $n_D$, relating to sodium-light, and by their reciprocal power of dispersion $\nu$.

*Example I (Fig. 1).*

| Radii. | Thicknesses and distances. |
|---|---|
| $r_1 = -734.6$ | $l = 43.3$ |
| $r_2 = +108.5$ | $d_I = 6.7$ |
| $r_3 = -147.2$ | $d_{II} = 60.0$ |
| $r_4 = +283.1$ | $m_1 = 0.7$ |
| $r_5 = -283.1$ | $d_{III} = 30.6$ |
| $r_6 = +124.3$ | $m_2 = 0.7$ |
| $r_7 = -124.3$ | $d_{IV} = 46.6$ |
| $r_8 = +3405$ | $d_V = 6.7$ |

*Kinds of glass.*

| | I. | II. | III. | IV. | V. |
|---|---|---|---|---|---|
| $n_D =$ | 1.6202 | 1.5399 | 1.5163 | 1.5399 | 1.6202 |
| $\nu =$ | 36.2 | 59.4 | 64.0 | 59.4 | 36.2 |

The said ocular is designed for being arranged in a telescope in such a manner that the distance $o$ of the diaphragm of the field of view, marked D, from the aperture-diaphragm, which is indicated in dotted lines, and marked A, amounts to 800 units, whereby the distance $p$ of the exit pupil from the last lens vertex amounts to 60 units.

*Example II (Fig. 2).*

| Radii. | Thicknesses and distances. |
|---|---|
| $r_1 = -223.1$ | $l = 36.0$ |
| $r_2 = +131.2$ | $d_I = 6.7$ |
| $r_3 = -131.2$ | $d_{II} = 60.0$ |
| $r_4 = +283.1$ | $m_1 = 0.7$ |
| $r_5 = -283.1$ | $d_{III} = 30.6$ |
| $r_6 = +116.6$ | $m_2 = 0.7$ |
| $r_7 = -139.2$ | $d_{IV} = 46.6$ |
| $r_8 = +687.3$ | $d_V = 6.7$ |

*Kinds of glass.*

| | I. | II. | III. | IV. | V. |
|---|---|---|---|---|---|
| $n_D =$ | 1.6202 | 1.5163 | 1.5163 | 1.5163 | 1.6202 |
| $\nu =$ | 36.2 | 64.0 | 64.0 | 64.0 | 36.2 |

This second ocular is designed for being arranged in a telescope in such a manner that the distance $o$ of the diaphragm of the field of view, marked D, from the aperture-diaphragm A amounts to 1305 units, whereby the distance $p$ of the exit pupil from the last lens vertex amounts to 68.6 units.

I claim:

In an ocular comprising two double lenses, each consisting of a collective and of a dispersive member, which are so disposed that the two dispersive members lie outermost, a single collective lens located between the two double lenses.

HEINRICH ERFLE.

Witnesses:
 PAUL KRUGER,
 RICHARD HAHN.